A. BECK & E. ANGERMÜLLER.
APPARATUS FOR CLEANING AND DAMPING GRAIN.
APPLICATION FILED NOV. 22, 1909.
987,943.
Patented Mar. 28, 1911.
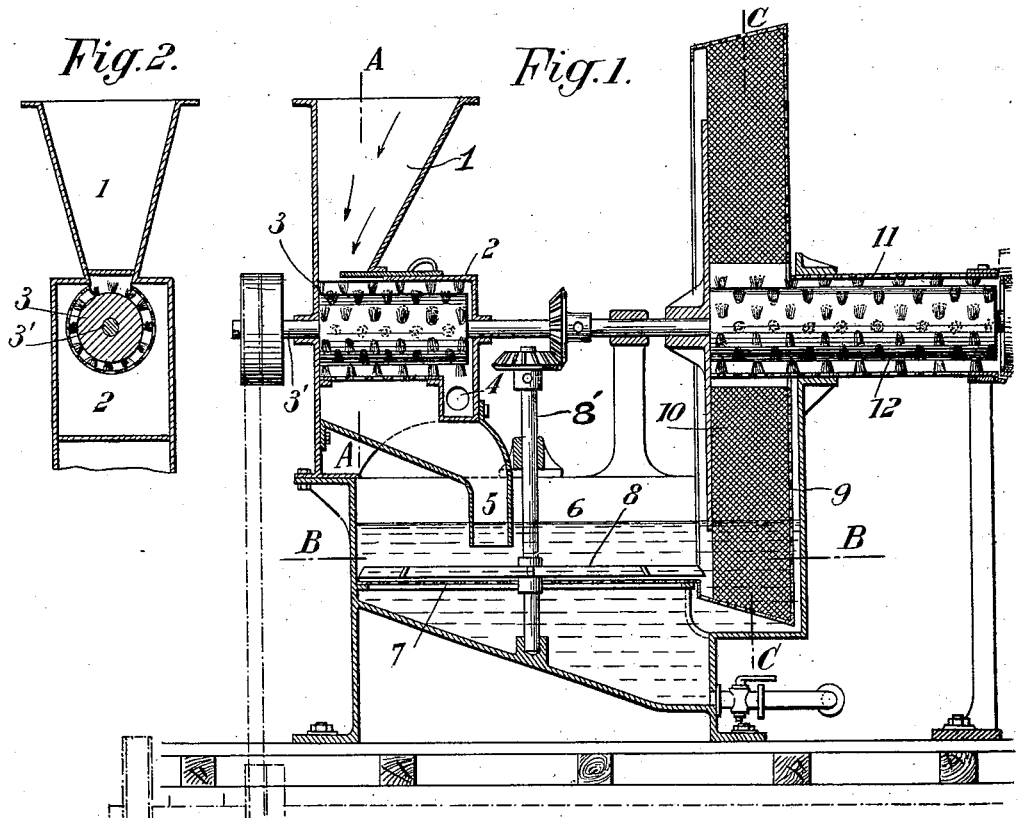
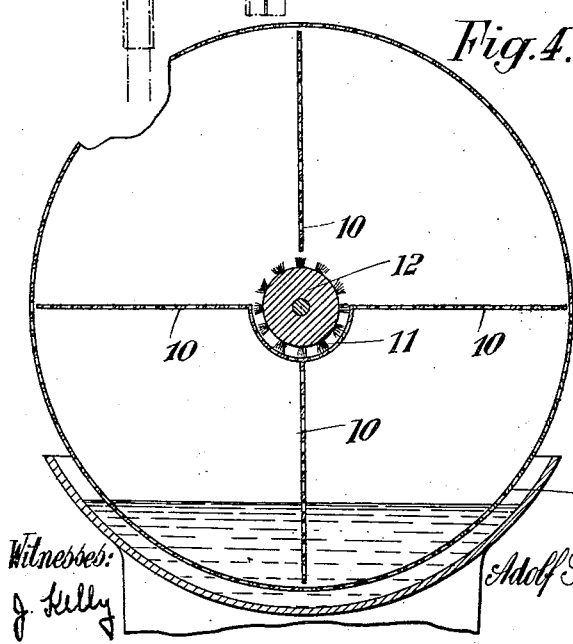
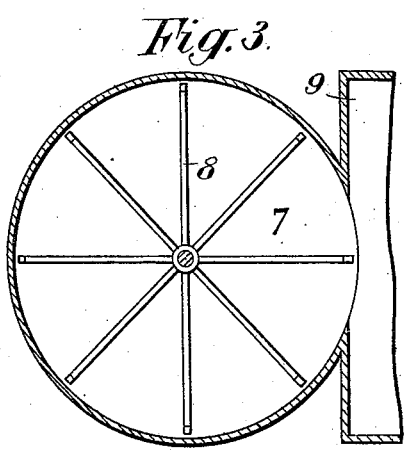
Witnesses:
J. Kelly
Inventors.
Adolf Beck a. Eduard Angermüller
by B. Singer,
Attorney.

UNITED STATES PATENT OFFICE.

ADOLF BECK AND EDUARD ANGERMÜLLER, OF COBURG, GERMANY.

APPARATUS FOR CLEANING AND DAMPING GRAIN.

987,943.  Specification of Letters Patent. Patented Mar. 28, 1911.

Original application filed October 28, 1908, Serial No. 459,926. Divided and this application filed November 22, 1909. Serial No. 529,195.

*To all whom it may concern:*

Be it known that we, ADOLF BECK and EDUARD ANGERMÜLLER, both subjects of the German Emperor, and both residing at Coburg, Germany, have invented certain new and useful Improvements in Apparatus for Cleaning and Damping Grain, of which the following is a specification.

This invention relates to an apparatus for cleaning and damping grain and more especially to an apparatus of this kind which will be suitable for the execution of the process for treating grain forming the subject matter of the United States Patent Serial No. 459,926 of which the present patent is a division.

The object of this invention is to provide a simple and efficient apparatus comprising means for freeing the grain from the coarser impurities, means for subjecting the grain to the action of a water bath having a suitable temperature so as to saturate the cellular tissue of the grains with moisture and means for removing from the outside of the grains the excess of moisture adhering thereto so as to prepare them for the subsequent treatment.

In the accompanying drawing, Figure 1 is a longitudinal section of the cleaning and damping device. Fig. 2 shows a section on line A—A of Fig. 1; Fig. 3 is a similar section on line B—B of same figure; Fig. 4 shows a section on line C—C of Fig. 1.

The grain is introduced into the apparatus through the funnel 1 and first arrives in the cleaning drum 2. The latter comprises a sieve mantle the meshes of which have such a width that the grains of corn and the like are adapted to pass through them while all coarser impurities such as earth, stones, wood, sand and so on are held back and are conveyed by a brush roller 3 mounted in a suitably driven shaft 3', to a suitable escape duct 4. The grain after having passed through the cleaning drum 2, arrives in the funnel 5 which conveys it into the water tank 6, containing water having a temperature about 8–10 degrees C. The latter comprises a sieve bottom 7 on which the grain falls about in the middle. A vertical shaft 8' is arranged in the center of the water tank; this shaft being suitably driven for instance by shaft 3' and carrying a plurality of stirring arms 8 which cause the grain falling on a bottom 7 near the shaft 8' to move and to travel toward the circumference of the tank. During the movements the husks of the grain absorb the amount of water which is necessary for obtaining a suitable moistening and at the same time the hollow grains which have no value are raised to the level of the water wherefrom they can be removed. On the other hand, the sand or the like which might have been carried on the grains runs through the sieve bottom. Afterward the grains which have been pushed outward by the arms 8 fall over the edge of the sieve bottom 7 into a vertically arranged circular casing 9 in which wings 10 rotate, which convey the grain into the drum 11 which is centrally arranged with reference to the casing 9. The rotating wings 10 are preferably made of wire gauze having narrow meshes, so that they are adapted to raise the grains from the tank 6 which carry with them as little water as possible. In the drum 11 which has a mantle of wire gauze or another suitable material, a conveying roller 12 rotates, this conveying roller being provided with brushes which cause the grain to move along while removing therefrom the excess of moisture adhering to the outside thereof. The grains are at this moment in such a state that their outside is nearly dry while the cellular tissue of the husks is saturated with water so that it easily yields when subjected to a slight pressure and friction; the grain proper contained in the husks, on the contrary is dry and is not affected in any manner nor modified either by the moisture or by the temperature.

Having now fully described our said invention, what we claim and desire to secure by Letters Patent, is:—

1. An apparatus for treating grain comprising in combination, a water tank, a cleaning drum having a refuse outlet end arranged over said tank and adapted to deliver the grain into said water tank, means in said cleaning drum for cleaning the grain, a drum arranged behind said water tank, means for conveying the moistened grain from the said water tank into the said drum and a brush conveying roller coöperating with said drum and adapted to free the grains from the moisture adhering to the outside thereof, substantially as and for the purpose set forth.

2. An apparatus for treating grain comprising in combination a substantially circular water tank, a cleaning drum arranged over said tank and comprising a drum made of perforated material and containing a brush roller, a sieve bottom in said water tank, means for discharging the cleaned grain in the said tank near the center thereof, means comprising a vertical shaft and a plurality of radial arms for stirring the grain resting on said sieve bottom of the tank and for conveying it toward the circumference of the tank, a vertical drum arranged behind said water tank and adapted to receive the grain from the latter, a conveying sieve drum centrally arranged with reference to said vertical drum, wire gauze wings rotating in said vertical drum and adapted to convey the grain from the bottom of the latter into the central conveying drum, and a conveying roller provided with brushes coöperating with said conveying drum and adapted to free the grains from the moisture adhering to the outside thereof, substantially as and for the purpose set forth.

3. An apparatus for treating grain comprising in combination, a tank containing water and adapted to receive the grain, a flat perforated horizontally disposed bottom in said tank below the water level for supporting the grain and permitting discharge of said foreign matter, and centrifugally acting means thrusting the grain radially outward to a discharging position.

4. An apparatus for treating grain comprising in combination, a tank containing water and adapted to receive the grain, a flat, perforated horizontally disposed support in said tank below the water level for supporting the grain and permitting discharge of the foreign matter, and centrifugally acting means rotatable about a vertical axis for moving the grain to a discharging position.

5. An apparatus for treating grain comprising in combination, a tank containing water and adapted to receive the grain, a horizontally disposed flat support in said tank supporting the grain below the water level, and horizontally acting means for discharging the grain radially from the axis of said means.

6. An apparatus for treating grain comprising in combination, a tank containing water for receiving the grain and having horizontally disposed flat bottom, means in said tank for thrusting the grain out of its range, and rotary perforated means having radial arms projecting below the water level for receiving and elevating the grain.

7. An apparatus for treating grain comprising in combination, a tank containing water for receiving the grain having a flat horizintal false bottom, means in said tank for moving the grain into a discharging position, and rotary means movable about a horizontal axis and projecting below the water level for receiving and elevating the grain.

8. An apparatus for treating grain comprising in combination, a tank containing water for receiving the grain and provided with a horizontally disposed flat perforated bottom, a centrifugally acting device disposed wholly below the water level for moving the grain into a discharging position and leaving the water surface free and accessible, and means extending into said tank below the water level thereof and centrally with respect to said centrifugally acting means for delivering the grain thereto.

9. An apparatus for treating grain comprising in combination, a tank containing water for receiving the grain, means for discharging the grain from said tank, a rotary perforated elevating device projecting below the water level for receiving and elevating the discharged grain, a perforated receiver disposed centrally of said device for receiving the grain elevated thereby, and means in said receiver for advancing the grain therein and removing moisture therefrom by attrition.

10. An apparatus for treating grain comprising in combination, a tank containing water for receiving the grain, means for discharging the grain from said tank, a device for elevating the discharged grain, a perforated receiver for receiving the grain from said device, and means in said receiver for removing the moisture from the grain by attrition.

11. An apparatus for treating grain comprising in combination, a tank containing water for receiving the grain, means for discharging the grain therefrom, a rotary device for elevating the discharged grain, a perforated receiver disposed centrally of said device for receiving the grain elevated thereby, and means in said receiver for removing the moisture from the grain therein by attrition.

In testimony whereof we have hereunto set our hands in presence of two witnesses.

ADOLF BECK.
EDUARD ANGERMÜLLER.

Witnesses:
OTTO FRANK,
HEINRICH RAHN.

---

Copies of this patent may be obtained for five cents each, by addressing the "Commissioner of Patents, Washington, D. C."